Patented Jan. 11, 1938

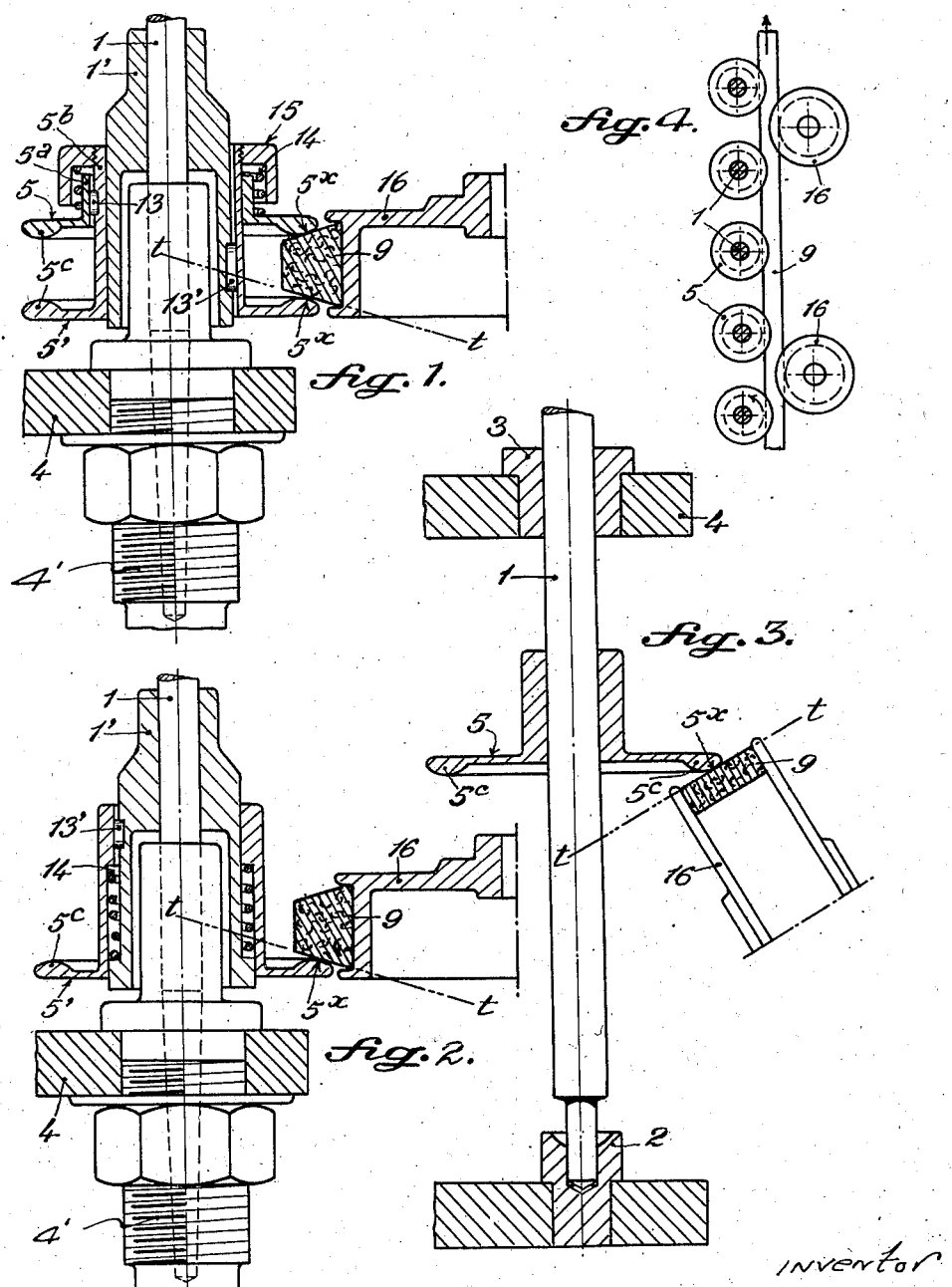

2,105,271

UNITED STATES PATENT OFFICE 2,105,271

WHARVE FOR SPINDLES FOR SPINNING, TWISTING, WINDING, AND SIMILAR MACHINES

Carlo Schleifer, Novara, Italy

Application August 14, 1936, Serial No. 96,098
In Italy May 13, 1936

4 Claims. (Cl. 118—47)

It is already known, in spinning, twisting, winding and similar machines, to drive the spindles by means of a continuous flexible member such as a belt, instead of the usual spindle bands, the said belt being kept in tangential engagement with the spindle wharves or pulleys of the several spindles under the action of a radial thrust. This thrust which is exerted by the belt perpendicularly to the axis of the spindle and which is usually effected by means of guide rollers of the belt itself, strains the spindle bearings and entails a larger expenditure of driving power. On the other hand, if the thrust of the guide rollers is insufficient, the contact between the belt and the spindle wharves is imperfect thereby causing loss of spindle speed.

For obviating these defects it has been proposed to employ a wharve for spindles which is pressed in an axial direction against the driving belt, in order to ensure the requisite adherence for the transmission of the drive, without straining the bearings of the spindle itself.

It is well known also the employ of wharves built up of two halves rigid with the spindle in the direction of rotation but free to slide along its axis, whilst spring means are provided for pressing them together by means of opposite axial thrust, against the continuous driving member or belt of rectangular, trapezoidal, polygonal, circular or any other section. The two halves of said wharve are of frusto-conical shape and together form a pulley with a triangular groove in which the continuous driving member or belt runs tangentially. With the said form of wharve, whatever may be the section of the belt, when this belt penetrates more or less deeply into the groove of the pulley, the distance between the axis of the pulley and the zone of contact of the belt changes, and consequently the speed of the spindle is also altered. Furthermore, the zones of contact between the belt and the pulley flanges are relatively large and at different points possess different peripheral speeds. In these zones of contact there is, in consequence, slip between the pulley and the belt, which has a constant linear velocity, and this slip, besides causing losses by friction, prevents the attainment of a uniform spindle speed.

Now the present invention relates to modifications in the form of the said wharve or pulley for spindles which aim at obviating these defects, whilst certain of these modifications aim also at simplifying the pulley itself by reducing it to one flange only, in which case the axial pressure exerted only in one direction by this single half against the belt, is taken up by the latter through the members which guide it.

According to the present invention the wharve is characterized by the feature that its flanges are provided with rounded lips to which the continuous driving member is tangential at the invariable points having the same peripheral speed, thereby preventing slip between the continuous driving member and the wharve and ensuring that the spindle, whatever may be the degree of penetration of the driving member into the wharve, turns at a well defined uniform speed.

Several forms of embodiment of the invention are represented, by way of example only, in the attached drawing, in which:—Figure 1 shows a vertical section of a spindle assembly with an expanding wharve built up of two halves. Figures 2 and 3 show in vertical section modifications of the said spindle assembly in which the wharve is reduced to one flange only. Figure 4 shows in plan the drive for several spindles by means of a belt running tangentially to the spindles.

For the purpose of the present invention the spindle 1 itself may be of any known form. The spindle illustrated in Figs. 1 and 2 is mounted as to turn in the spindle bearing 4' fixed to the frame or ring rail 4, whilst the spindle illustrated in Fig. 3 is mounted as to turn, at its lower end, in the footstep 2 and, at its upper end, in the bearing 3 rigidly secured to the frame 4.

According to the form of the embodiment illustrated in Fig. 1 the wharve consists of two halves 5, 5'. The half 5' of the wharve is mounted on the bush 1', rigid with the spindle, by means of its sleeve $5^b$, so as to be free to slide axially but the said half 5' is held against rotation by a sliding key 13' inserted in suitable seatings in 1' and $5^b$. The other half 5, by means of its sleeve $5^a$ is mounted so as to be free to slide axially along the sleeve $5^b$ and is held against rotation by a sliding key 13 inserted in suitable seatings in $5^a$ and $5^b$. A pressure spring 14, inserted between the half 5 of the wharve and the cap 15 which is screwed on to the end of the sleeve $5^b$, acts simultaneously on the two halves 5, 5', forcing them in opposite directions against the belt 9 which, guided by its guide rollers 16, engages tangentially in its path with the wharves of the set of spindles 1 to be driven (see Figure 4). According to this form of embodiment each flange of the two halves of the pulley is provided with a rounded lip $5^c$ to which the belt 9 is tangential. Contact between the belt 9 and the pulley takes place therefore only at two opposite points $5^x$, provided that each line of tangency, such as $5^x$ $t$—$t$, is oblique to the axis of the spindle. Whatever may be the degree of penetration of the belt 9 into the groove of the pulley or wharve, these points of contact 5ˣ, having the same peripheral speed, do not change, whatever may be the section of the belt, for example trapezoidal, polygonal or round, provided that the direction of the lines of tangency, such as $t$—$t$, remains the same. All slip between the belt and the pulley flanges is thus excluded and a well defined uniform speed of the spindle 1 is ensured.

According to the modification shown in Figure 2 the wharve of the spindle is simplified by reducing it to one only of the two halves, that at 5', that is to say, to a disc. This half 5' is mounted so as to be free to slide, but not to turn on the bush 1', and a spring 14 pushes its rounded lip 5ᶜ against the belt 9 upwards in an axial direction. The axial thrust in the opposite direction, which is present in the form of embodiment of Figure 1, is here replaced by the reaction of the belt 9 against the guide rollers 16. The axial thrust of the disc to which the wharve is subjected, instead of being exerted by a spring, such as 14, may also be obtained by the action of gravity, i. e. by the weight of the disc 5 itself or of the assembly of the spindle 1, as is the case in the modification of Figure 3, in which is shown the use of a belt 9 of rectangular section. Like the modifications of Figures 2 and 3, the rounded lip 5ᶜ of the wharve makes contact with the belt 9 at a point 5ˣ. A well defined uniform speed is thus assured to the spindle, whatever may be the section of the belt 9, provided that the direction of the line of tangency $t$—$t$, oblique to the spindle axis, remains unaltered.

What I claim is:—

1. In a belt driven device, the combination of a rotatable spindle, a wharve supported on said spindle, means for preventing rotation of said wharve with respect to said spindle, said means permitting axial movement of said wharve with respect to said spindle, a rounded convex annular protuberance carried by the periphery of said wharve, a belt, means for guiding said belt to a position adjacent said wharve, said wharve being axially movable whereby the annular protuberance thereof tangentially engages said belt.

2. Apparatus in accordance with claim 1 wherein the wharve is formed of two disks adapted to be mutually displaced in an axial direction with respect to said spindle, an annular convex protuberance on the opposite peripheral face of each disk, and a spring for forcing the two disks into engagement with the belt.

3. Apparatus in accordance with claim 1 wherein the wharve is in the form of a disk having an annular convex protuberance on one of the peripheral faces thereof and resilient means for urging the protuberance of said disk into engagement with the belt.

4. Apparatus in accordance with claim 1 wherein the wharve is in the form of a disk having an annular convex protuberance on the periphery thereof and the belt being arranged in such a manner that the disk is forced against the belt by the action of the weight of said disk.

CARLO SCHLEIFER.